(12) United States Patent
Bremmer et al.

(10) Patent No.: US 9,427,940 B2
(45) Date of Patent: Aug. 30, 2016

(54) IMPACT RESISTANT COMPOSITE PANEL AND METHOD OF FORMING A COMPOSITE PANEL

(71) Applicant: Sikorsky Aircraft Corporation, Stratford, CT (US)

(72) Inventors: Jonathan Bremmer, Glastonbury, CT (US); Darryl Mark Toni, Madison, CT (US); William E. Hovan, III, Oxford, CT (US); Allan R. Macallister, Jr., Milford, CT (US); Jeffrey G. Sauer, Woodbury, CT (US); Christian A. Rogg, New Milford, CT (US); Robert A. Lacko, Oxford, CT (US); David M. Lent, Guilford, CT (US); Andrew Varga, Milford, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 268 days.

(21) Appl. No.: 14/077,598

(22) Filed: Nov. 12, 2013

(65) Prior Publication Data

US 2015/0133016 A1    May 14, 2015

(51) Int. Cl.
| | |
|---|---|
| *B32B 17/06* | (2006.01) |
| *B32B 5/12* | (2006.01) |
| *B32B 5/26* | (2006.01) |
| *B32B 17/00* | (2006.01) |
| *B29C 70/00* | (2006.01) |
| *B29C 70/30* | (2006.01) |

(52) U.S. Cl.
CPC ............. *B32B 17/067* (2013.01); *B29C 70/00* (2013.01); *B29C 70/30* (2013.01); *B32B 5/12* (2013.01); *B32B 5/26* (2013.01); *B32B 17/00* (2013.01); *B32B 2250/05* (2013.01); *B32B 2262/106* (2013.01); *B32B 2605/18* (2013.01); *Y10T 428/249921* (2015.04); *Y10T 442/30* (2015.04)

(58) Field of Classification Search
CPC ......... B32B 5/12; B32B 5/26; B32B 17/067; B32B 17/00; B32B 2262/106; B32B 2250/05; B32B 2605/18; Y10T 428/249921; Y10T 442/30; B29C 70/30; B29C 70/00
USPC .......................................... 428/188; 442/181
See application file for complete search history.

(56) References Cited

U.S. PATENT DOCUMENTS

| | | | |
|---|---|---|---|
| 6,834,159 B1 | 12/2004 | Schramm | |
| 7,625,618 B1 * | 12/2009 | Allen | B29C 70/44 428/36.91 |
| 7,867,928 B2 | 1/2011 | Toni et al. | |
| 8,043,458 B2 | 10/2011 | Goodworth et al. | |

* cited by examiner

*Primary Examiner* — Catherine A Simone
(74) *Attorney, Agent, or Firm* — Cantor Colburn LLP

(57) ABSTRACT

A composite panel includes a support layer including a first plurality of prepreg plies wrapped around at least one mandrel; a mid-plane impact layer including a second plurality of prepreg plies, the mid-plane impact layer adjacent to the support layer; a upper skin layer including a third plurality of prepreg plies, the upper skin layer adjacent to the mid-place impact layer; and a lower skin layer including a fourth plurality of prepreg plies, the lower skin layer adjacent to the support layer; whereby each of the first, second, third, and fourth plurality of prepreg plies are co-cured to form the composite panel.

10 Claims, 7 Drawing Sheets

| Layer | Ply | Orientation | Thickness (in) |
|---|---|---|---|
| Support 52 | Woven Fiberglass | 0/90 | 0.010 |
| | Woven Graphite | 0/90 | 0.008 |
| | Woven Graphite | 45 | 0.008 |
| | Woven Graphite | 45 | 0.008 |
| Mid-plane 54 | Woven Fiberglass | 0/90 | 0.010 |
| | Woven Fiberglass | 0/90 | 0.010 |
| | Woven Fiberglass | 0/90 | 0.010 |
| Upper Skin 56 | Woven Graphite | 45 | 0.008 |
| | Woven Graphite | 45 | 0.008 |
| | Woven Graphite | 0/90 | 0.008 |
| | Woven Fiberglass | 0/90 | 0.010 |
| Lower Skin 58 | Woven Graphite | 0/90 | 0.008 |
| | Woven Graphite | 45 | 0.008 |
| | Woven Graphite | 0/90 | 0.008 |

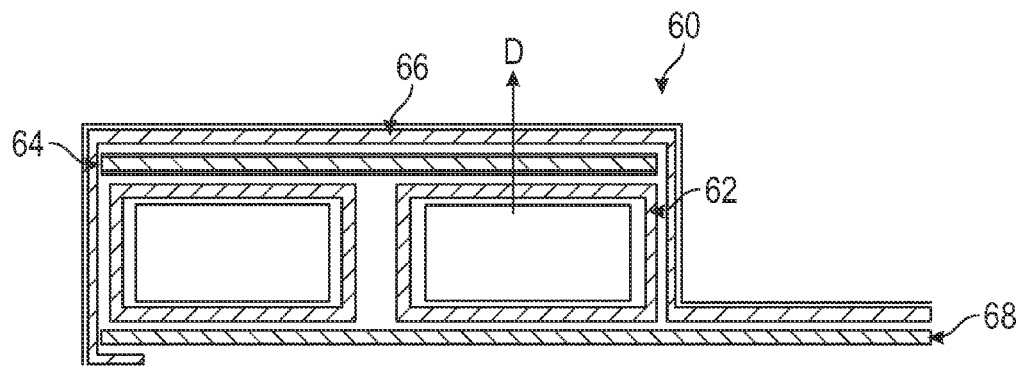

FIG. 4A

| Layer | Ply | Orientation | Thickness (in) |
|---|---|---|---|
| Support 62 | Unidirectional Fiberglass S | 90 | 0.010 |
| | Woven Graphite | 0/90 | 0.008 |
| | Woven Graphite | 45 | 0.008 |
| | Woven Graphite | 45 | 0.008 |
| Mid-plane 64 | Unidirectional Fiberglass S | 0 | 0.010 |
| | Woven Fiberglass | 0/90 | 0.010 |
| | Unidirectional Fiberglass S | 0 | 0.010 |
| Upper Skin 66 | Woven Graphite | 45 | 0.008 |
| | Woven Graphite | 45 | 0.008 |
| | Woven Graphite | 0/90 | 0.008 |
| | Unidirectional Fiberglass S | 90 | 0.010 |
| Lower Skin 68 | Woven Graphite | 0/90 | 0.008 |
| | Woven Graphite | 45 | 0.008 |
| | Woven Graphite | 0/90 | 0.008 |

FIG. 4B

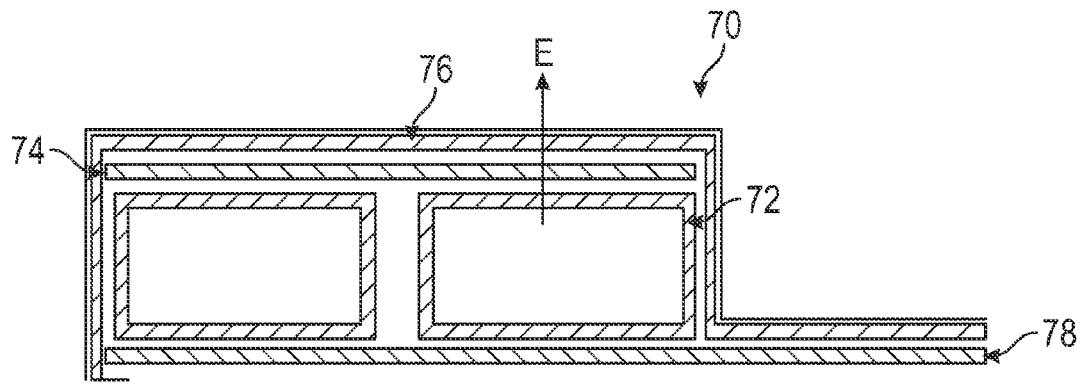

FIG. 5A

| Layer | Ply | Orientation | Thickness (in) |
|---|---|---|---|
| Support 72 | Unidirectional Fiberglass S<br>Unidirectional Fiberglass S<br>Unidirectional Graphite<br>Unidirectional Graphite<br>Unidirectional Grapithe | 45<br>-45<br>-45<br>45<br>90 | 0.010<br>0.008<br>0.008<br>0.008<br>0.010 |
| Mid-plane 74 | Unidirectional Graphite<br>Unidirectional Graphite<br>Unidirectional Grapithe | 0<br>90<br>0 | 0.010<br>0.010<br>0.010 |
| Upper Skin 76 | Unidirectional Graphite<br>Unidirectional Graphite<br>Unidirectional Grapithe<br>Unidirectional Grapithe<br>Unidirectional Fiberglass S<br>Unidirectional Fiberglass S | 0<br>90<br>45<br>-45<br>-45<br>45 | 0.010<br>0.010<br>0.008<br>0.008<br>0.008<br>0.010 |
| Lower Skin 78 | Unidirectional Graphite<br>Unidirectional Graphite<br>Unidirectional Grapithe<br>Unidirectional Grapithe<br>Unidirectional Grapithe | 45<br>-45<br>-45<br>45<br>90 | 0.008<br>0.008<br>0.008<br>0.008<br>0.008 |

FIG. 5B

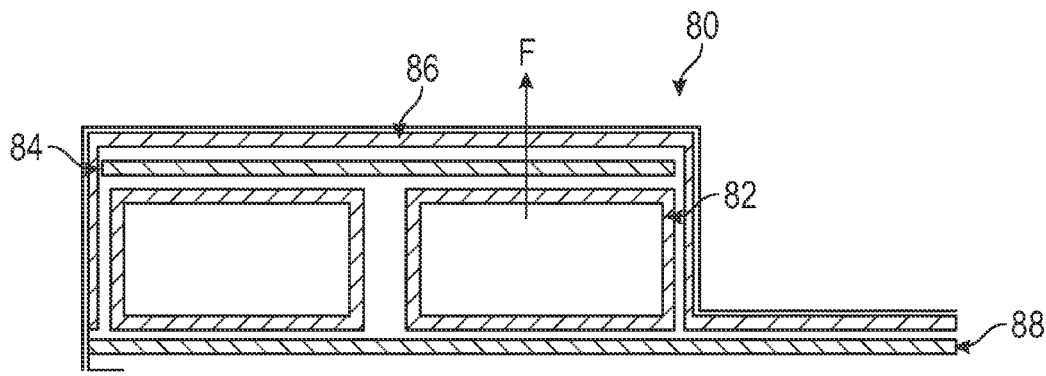

FIG. 6A

| Layer | Ply | Orientation | Thickness (in) |
|---|---|---|---|
| Support 82 | Unidirectional Fiberglass S<br>Unidirectional Fiberglass S<br>Unidirectional Graphite<br>Unidirectional Graphite<br>Unidirectional Graphite | 45<br>-45<br>-45<br>45<br>90 | 0.010<br>0.008<br>0.008<br>0.008<br>0.010 |
| Mid-plane 84 | Unidirectional Graphite<br>Unidirectional Graphite<br>Unidirectional Graphite | 0<br>90<br>0 | 0.010<br>0.010<br>0.010 |
| Upper Skin 86 | Unidirectional Graphite<br>Unidirectional Graphite<br>Unidirectional Graphite<br>Unidirectional Graphite<br>Unidirectional Fiberglass S<br>Unidirectional Fiberglass S | 0<br>90<br>45<br>-45<br>-45<br>45 | 0.010<br>0.010<br>0.008<br>0.008<br>0.008<br>0.010 |
| Lower Skin 88 | Unidirectional Graphite<br>Unidirectional Graphite<br>Unidirectional Graphite<br>Unidirectional Graphite<br>Unidirectional Graphite | 45<br>-45<br>-45<br>45<br>90 | 0.008<br>0.008<br>0.008<br>0.008<br>0.008 |

IMPACT RESISTANT COMPOSITE PANEL AND METHOD OF FORMING A COMPOSITE PANEL

STATEMENT REGARDING FEDERALLY SPONSORED RESEARCH OR DEVELOPMENT

This invention was made with Government support with the United States Navy under Contract No. N00019-06-0081. The Government therefore has certain rights in this invention.

FIELD OF THE INVENTION

The subject matter disclosed herein relates generally to the field of composite structures, and more particularly, to an impact resistant composite panel and methods for making such composite panels.

DESCRIPTION OF THE RELATED ART

Conventional aircraft floor systems incorporate thin metallic or composite prepreg skin materials adhesively bonded to either a metallic or non-metallic honeycomb. Recent improvements in machining technology have led to the use of high speed machined aluminum floor designs for rotary-wing aircraft. High speed machined metallic aircraft floor systems require minimal tooling and have higher tolerances, but may not achieve the weight benefits of composite floor systems. Although composite floor systems are generally lighter in weight than metallic floors, composite floor systems may be more expensive and labor intensive to manufacture compared to metallic floor systems.

Conventional typical aircraft composite floor system floor panels utilize a honeycomb core material with pre-cured fiberglass or graphite composite skins (prepreg) bonded thereto in a large heated press or autoclave. Local hard points and edge closeouts are typically accomplished using an epoxy potting compound. These composite floor system floor panels may require relatively complicated and labor intensive process steps to complete fabrication of an individual panel. Moreover, usage of honeycomb core structures in rotary-wing aircraft composite floor systems may suffer inherent moisture absorption in service due to the open cell structure. Such moisture absorption may result in increased weight and resultant performance degradation over a prolonged time period. Accordingly, it is desirable to provide a lightweight aircraft floor system that meets or exceeds design requirement.

BRIEF SUMMARY OF THE INVENTION

According to one aspect of the invention, a method of forming a composite panel includes applying a support layer to each of a plurality of mandrels to form a plurality of wrapped mandrels; stacking each of the wrapped mandrels in a defined orientation; applying a mid-plane impact layer on top of wrapped mandrels; applying an upper skin layer on top of the mid-place impact layer; applying a lower skin layer to the bottom of the wrapped mandrels; and curing the support layer, the mid-plane layer, upper skin layer, and lower skin layer together at an elevated temperature and pressure; where each of the support layer, the mid-plane impact layer, the upper skin layer, and the lower skin layer includes a plurality of prepreg plies.

According to another aspect of the invention, a composite panel includes a support layer including a first plurality of prepreg plies wrapped around at least one mandrel; a mid-plane impact layer including a second plurality of prepreg plies, the mid-plane impact layer adjacent to the support layer; a upper skin layer including a third plurality of prepreg plies, the upper skin layer adjacent to the mid-place impact layer; and a lower skin layer including a fourth plurality of prepreg plies, the lower skin layer adjacent to the support layer; whereby each of the first, second, third, and fourth plurality of prepreg plies are co-cured to form the composite panel.

Other aspects, features and techniques of the invention will become more apparent from the following description taken in conjunction with the drawings.

BRIEF DESCRIPTION OF THE SEVERAL VIEWS OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which like elements are numbered alike in the several FIGURES:

FIG. 4A is partial cross-sectional view of a composite panel according to an embodiment of the invention;

FIG. 4B is a chart delineating each layer of the composite panel of FIG. 4A according to an embodiment of the invention;

FIG. 5A is partial cross-sectional view of a composite panel according to an embodiment of the invention;

FIG. 5B is a chart delineating each layer of the composite panel of FIG. 5A according to an embodiment of the invention;

FIG. 6A is partial cross-sectional view of a composite panel according to an embodiment of the invention;

FIG. 6B is a chart delineating each layer of the composite panel of FIG. 6A according to an embodiment of the invention.

DETAILED DESCRIPTION OF THE INVENTION

Figure 1A:
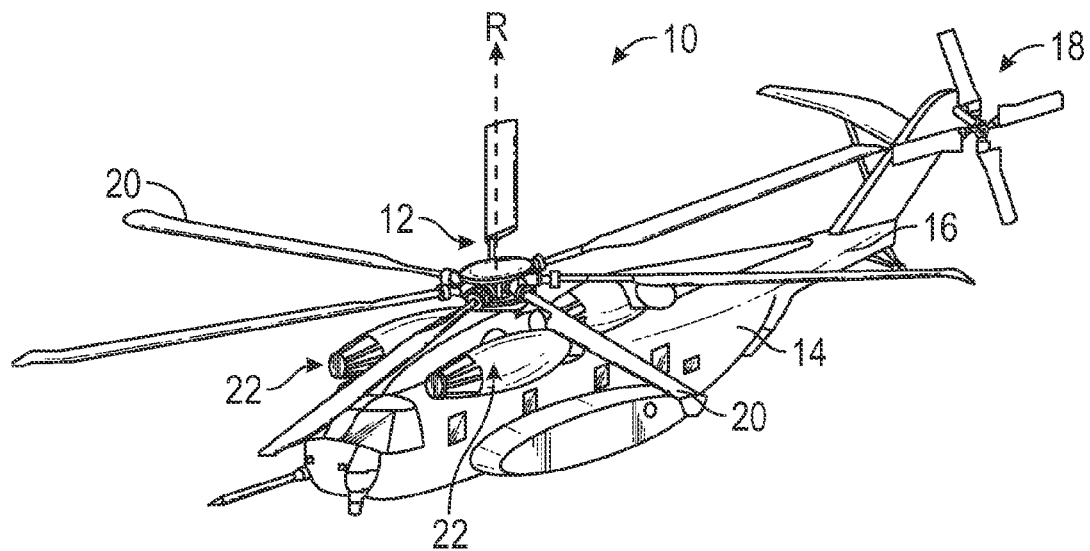
FIG. 1A is a general perspective view of an exemplary rotary wing aircraft for use with an embodiment of the invention.
Figure 1B:
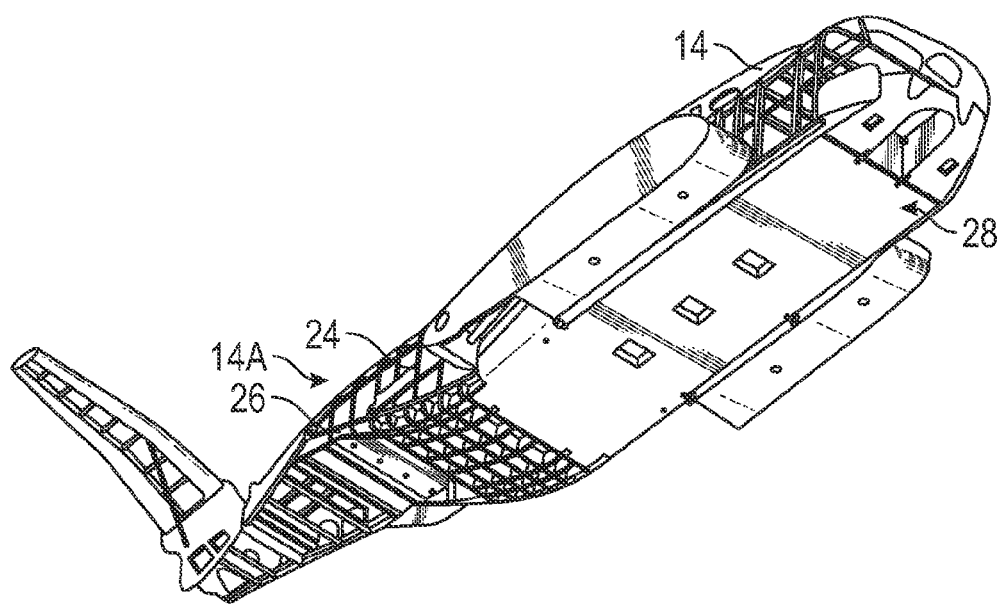
FIG. 1B is a partial perspective view of the rotary wing aircraft of FIG. 1A which utilizes a composite panel according to an embodiment of the invention.

Referring to the figures, FIGS. 1A-1B schematically illustrates a rotary-wing aircraft 10 incorporating a composite panel 30 (FIGS. 2A-6B) according to an embodiment of the invention. As illustrated in FIG. 1A, rotary-wing aircraft 10 has a main rotor system 12 and includes an airframe 14 having an extending tail 16 which mounts a tail rotor system 18, such as an anti-torque system. The main rotor system 12 is shown with a multiple of rotor blades 20 mounted to a rotor hub. The main rotor system 12 is driven about an axis of rotation R through a main gearbox by one or more engines 22. While embodiments of the invention are shown and described with reference to a rotary-wing aircraft 10 and are particularly suited to a rotary-wing aircraft 10, aspects of this invention can also be used in other configurations and/or machines such as, for example, automotive applications including commercial and military ground vehicles, building structures, construction applications such as infrastructure, cargo applications, oil and gas industrial applications, shipping applications including containers for rail, marine and aircraft, fixed-wing aircraft applications, non-rotary-aircraft applications, high speed compound rotary wing aircraft with supplemental translational thrust systems, dual contra-rotating, coaxial rotor system aircraft, turbo-props, tilt-rotors and tilt-wing aircraft.

Referring to FIG. 1B, the airframe 14 includes an airframe section 14A. The airframe section 14A may include a multitude of frame members 24 and a multitude of beam members 26 which support a cabin floor system 28. The multitude of frame members 24 and beam members 26 may be arranged in a generally rectilinear pattern. The cabin floor system 28 may be formed of a multiple of composite panels 30 (See e.g., FIG. 2A) utilizing a box beam construction for providing the rigidity for rotor-craft applications. It is to be appreciated that additional composite panels 30 may be assembled in other areas of the airframe 14A and provide the rigidity necessary for high impact rotor-craft applications.

Figure 2A:
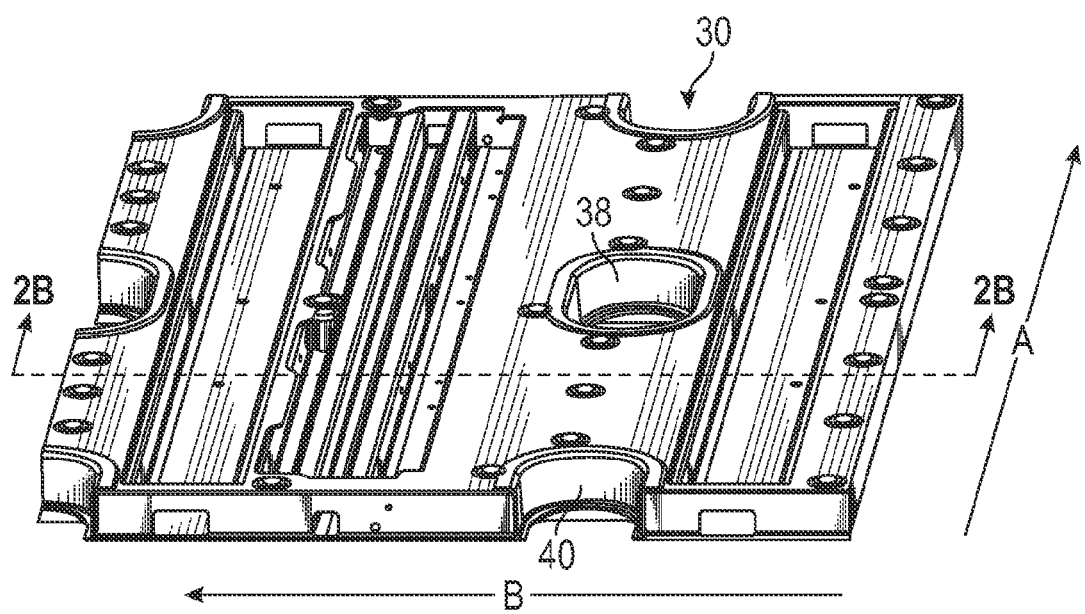
FIG. 2A is a general perspective view of a composite panel of FIG. 1B.
Figure 2B:
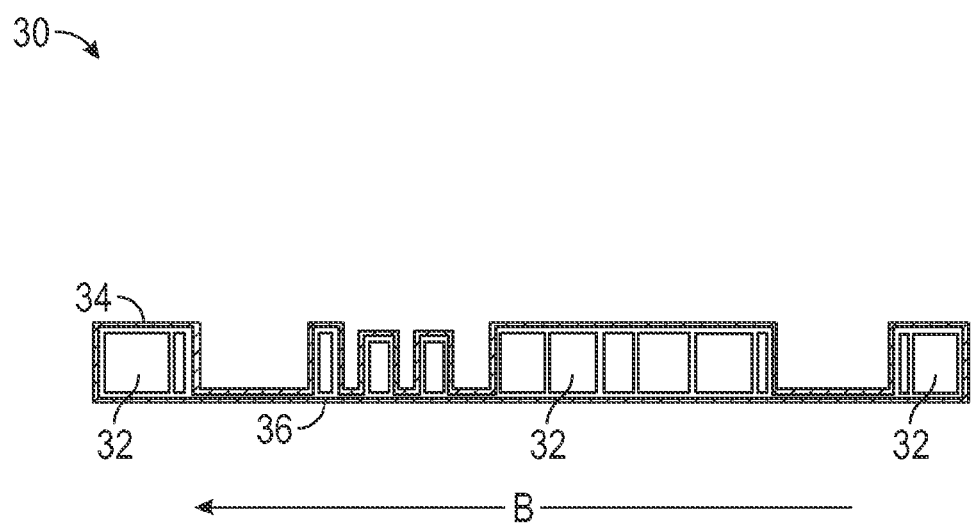
FIG. 2B is a sectional view of a composite panel according to an embodiment of the invention.

Referring to FIGS. 2A-2B, the composite panel 30 for use with the cabin floor system 28 (FIG. 1B) is illustrated according to an exemplary embodiment of the invention. As illustrated, each composite panel 30 may be manufactured using a box beam construction that includes wrapping a multiple of unidirectional or woven fiberglass or graphite fiber plies impregnated with an epoxy resin (fiberglass or graphite prepreg) around a multiple of mandrels (not shown). In an embodiment, the woven plies have at least two threads that are woven together in a plain weave pattern. Also, the prepreg plies may include prepreg tape or prepreg fabric. A plurality of similarly wound mandrels are assembled together and co-cured with additional prepreg plies to form a multi-laminate composite panel. In embodiments, the composite panel 30 may utilize a mandrel (not shown) of various shapes and sizes such as, for example, a rectangular, a triangular, a square, or the like for the specific application.

In an embodiment, the composite panel 30 is assembled as a sandwich structure having a multiple of layers with a multiple of prepreg plies bonded together and co-cured at the same time through an autoclave process to form a multi-laminate assembly. The composite panel 30 may be manufactured in a single curing process using an autoclave processing but other processing techniques may be utilized. As illustrated in FIGS. 2A-2B, the composite panel 30 is a multi-laminate system and may be formed from a multiple of prepreg plies forming the uncured layers and generally includes a multiple of rectilinear box members defining a support layer 32, a multi-ply mid-plane impact layer (shown in FIGS. 3A-6B), an upper skin layer 34 and a lower skin layer 36. These uncured layers are coupled together during assembly and co-cured in an autoclave processing method to form a co-bonded composite panel 30. As illustrated in FIG. 2B, each support layer forming the support laminate 32 includes a box construction that may be manufactured by wrapping one or more unidirectional or woven prepreg plies about a generally rectangular mandrel (having a longitudinal length along axis A). Additionally, the wound mandrels (not shown) may be arranged or stacked with a multiple of similar prepreg wound mandrels along axis B. The stacked prepreg wound mandrels are sandwiched between a multiple of prepreg plies that may be draped onto the plurality of mandrels (not shown) and are co-bonded and co-cured using prepreg autoclave processing to yield a lightweight and impact tolerant composite panel 30 having a generally hollow support structure. A trimming operation may be performed after the autoclave curing process in order to provide other feature openings, for example opening 38, for installation of tie-down pans 40. In embodiments, the composite panel 30 including a support laminate 32, upper skin laminate 34, mid-plane impact laminate (See e.g., FIG. 3A), and lower skin laminate 36 may be manufactured from a thermoset composite matrix material including a multiple of thermoset composite fibers. In an embodiment, the unidirectional or woven graphite and fiberglass plies may be HexPly® Prepreg available from the Hexcel Corporation and may include graphite prepreg as a plain weave IM7 3K with an 8552 resin system, fiberglass prepreg ply as unidirectional fiberglass S-2 with an 8552 resin system, and a woven fiberglass as 7781 8HS fiberglass with an 8552 resin system.

Figures 3A, 3B:
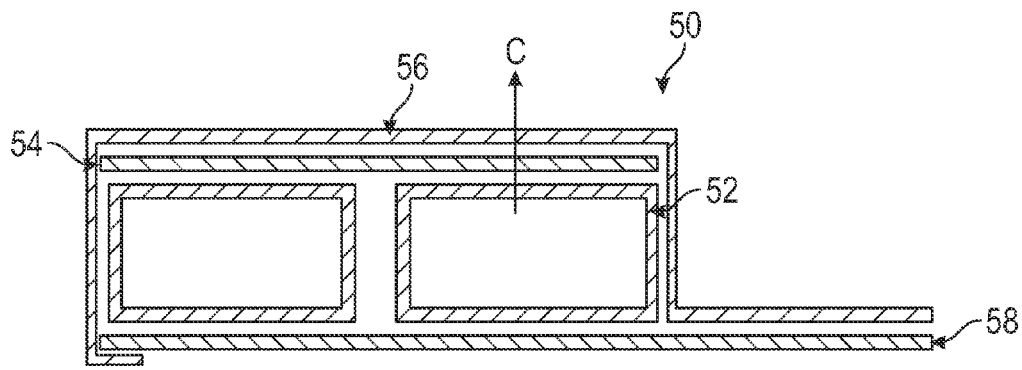
FIG. 3A is partial cross-sectional view of a composite panel according to an embodiment of the invention.
FIG. 3B is a chart delineating each layer of the composite panel of FIG. 3A according to an embodiment of the invention.

FIGS. 3A-3B illustrate a composite panel 50 to be used with cabin floor system 28 (FIG. 1B) that is constructed according to an exemplary embodiment. As illustrated, composite panel 50 is constructed from a multiple of prepreg plies to form the respective laminates described above in FIG. 2A-2B and generally includes a multi-ply support layer 52, a mid-plane impact layer 54, an upper skin layer 56 and a lower skin layer 58. The support layer 52 is a four-ply layer and includes, traversing radially outwards from the center of support layer 52 in direction of axis C, a 0 (zero) degree or 90 (ninety) degree woven fiberglass ply, a 0 (zero) degree or 90 (ninety) degree woven graphite ply, a 45 (forty-five) degree woven graphite ply, and a 45 (forty-five) degree woven graphite ply. The mid-plane impact layer 54 is a three-ply layer and includes, traversing radially outwards, a 0 (zero) degree or 90 (ninety) degree woven fiberglass ply, a 0 (zero) degree or 90 (ninety) degree woven fiberglass ply, and a 0 (zero) degree or 90 (ninety) degree woven fiberglass ply. The upper skin layer 56 is a four-ply layer and includes, traversing radially outwards, a 45 (forty-five) degree woven graphite ply, a 45 (forty-five) degree woven graphite ply, a 0 (zero) degree or 90 (ninety) degree woven graphite ply, and a 0 (zero) degree or 90 (ninety) degree woven fiberglass ply. The lower skin layer 58 is a three-ply layer and includes, traversing radially outwards, a 0 (zero) degree or 90 (ninety) degree woven graphite ply, a 45 (forty-five) degree woven graphite ply, and a 0 (zero) degree or 90 (ninety) degree woven graphite ply. FIG. 3B is a chart delineating each layer of the composite panel 50. It is to be appreciated that graphite ply constitutes about 60 percent while fiberglass constitutes about 40 percent of the total number of prepreg plies used in the composite panel 50, but other percentages may be utilized. It is also to be appreciated that the support layer 52, mid-plane impact layer 54, and upper skin layer 56 include prepreg plies that are arranged in a symmetrical order as we traverse radially outwards from the surface of the mandrel to the upper skin layer 56 in order to support thermal expansion of the plies and minimize or reduce warping of the plies during cure. For example, the inner most ply of support layer 52 that is immediately adjacent to the mandrel is the same as the outermost ply of the upper skin layer 56, which is 0 (zero) degree or 90 (ninety) degree woven fiberglass ply. Similarly, there is a symmetrical arrangement of the other prepreg plies as we traverse radially outwards from the innermost ply of support layer 52.

FIGS. 4A-4B illustrate a composite panel 60 to be used with cabin floor system 28 (FIG. 1B) that is constructed according to an exemplary embodiment. As illustrated, composite panel 60 generally includes a multi-ply support layer 62, a mid-plane impact layer 64, an upper skin layer 66 and a lower skin layer 68. The support layer 62 is a four-ply layer and includes, traversing radially outwards from the center of support layer 62 in a direction of axis D, a 90 (ninety) degree unidirectional fiberglass S-2 ply, a 0 (zero) degree or 90 (ninety) degree woven graphite ply, a 45 (forty-five) degree woven graphite ply, and a 45 (forty-five) degree woven graphite ply. The mid-plane impact layer 64 is a three-ply layer and includes, traversing radially outwards, a 0 (zero) degree unidirectional fiberglass S-2 ply, a 0 (zero) degree or 90 (ninety) degree woven fiberglass ply, and a 0 (zero) degree unidirectional fiberglass S-2 ply. The upper skin layer 66 is a four-ply layer and includes, traversing radially outwards, a 45 (forty-five) degree woven graphite ply, a 45 (forty-five) degree woven graphite ply, a 0 (zero) degree or 90 (ninety) degree woven graphite ply, and a 90 (ninety) degree unidirectional fiberglass S-2 ply. The lower skin layer 68 is a three-ply layer and includes, traversing radially outwards, a 0 (zero) degree or 90 (ninety) degree woven graphite ply, a 45 (forty-five) degree woven graphite ply, and a 0 (zero) degree or 90 (ninety) degree woven graphite ply. FIG. 4B is a chart delineating each layer of the composite panel 60. It is to be appreciated that graphite ply constitutes about 60 percent while fiberglass constitutes about 40 percent of the total number of prepreg plies used in the composite panel 60, but other percentages may be utilized. It is also to be appreciated that the support layer 62, mid-plane impact layer 64, and upper skin layer 66 include prepreg plies that are arranged in a symmetrical order as we traverse radially outwards from the surface of the mandrel to the upper skin layer 66 in order to support thermal expansion of the plies and minimize or reduce warping of the plies during cure. For example, the inner most ply of support layer 62 that is immediately adjacent to the mandrel is the same as the outermost ply of the upper skin layer 66, which is 90 (ninety) degree unidirectional fiberglass S-2 ply. Similarly, there is a symmetrical arrangement of the other prepreg plies as we traverse radially outwards from the innermost ply of support layer 62.

FIGS. 5A-5B illustrate a composite panel 70 to be used with cabin floor system 28 (FIG. 1B) that is constructed according to an exemplary embodiment. As illustrated, composite panel 70 generally includes a multi-ply support layer 72, a mid-plane impact layer 74, an upper skin layer 76 and a lower skin layer 78. The support layer 72 is a five-ply layer and includes, traversing radially outwards from the center of support layer 72 in direction of axis E, a 45 (forty-five) degree unidirectional fiberglass S-2 ply, a −45 (minus forty-five) degree unidirectional fiberglass S-2 ply, a −45 (minus forty-five) degree unidirectional graphite ply, a 45 (forty-five) degree unidirectional graphite ply, and a 90 (ninety) degree unidirectional graphite ply. The mid-plane impact layer 74 is a three-ply layer and includes, traversing radially outwards, a 0 (zero) degree unidirectional graphite ply, a 90 (ninety) degree unidirectional graphite ply, and a 0 (zero) degree unidirectional graphite ply. The upper skin layer 76 is a six-ply layer and includes, traversing radially outwards, a 0 (zero) degree unidirectional graphite ply, a 90 (ninety) degree unidirectional graphite ply, a 45 (forty-five) degree unidirectional graphite ply, a −45 (minus forty-five) degree unidirectional graphite ply, a −45 (minus forty-five) unidirectional fiberglass S-2 ply, and a 45 (forty-five) degree unidirectional fiberglass S-2 ply. The lower skin layer 78 is a five-ply layer and includes, traversing radially outwards, a 45 (forty-five) degree unidirectional graphite ply, a −45 (minus forty-five) degree unidirectional graphite ply, a −45 (minus forty-five) degree unidirectional graphite ply, a 45 (forty-five) degree unidirectional graphite ply, and a 90 (ninety) degree unidirectional graphite ply. FIG. 5B is a chart delineating each layer of the composite panel 70. It is to be appreciated that graphite ply constitutes about 80 percent while fiberglass constitutes about 20 percent of the total number of prepreg plies used in the composite panel 70, but other percentages may be utilized. It is also to be appreciated that the support layer 72, mid-plane impact layer 74, and upper skin layer 76 include prepreg plies that are arranged in a symmetrical order as we traverse radially outwards from the surface of the mandrel to the upper skin layer 76 in order to support thermal expansion of the plies and minimize or reduce warping of the plies during cure. For example, the inner most ply of support layer 72 that is immediately adjacent to the mandrel is the same as the outermost ply of the upper skin layer 76, which is a 45 (forty-five) degree unidirectional fiberglass S-2 ply. Similarly, there is a symmetrical arrangement of the other prepreg plies as we traverse radially outwards from the innermost ply of support layer 72.

FIGS. 6A-6B illustrate a composite panel 80 to be used with cabin floor system 28 (FIG. 1B) that is constructed according to an exemplary embodiment. As illustrated, composite panel 80 generally includes a multi-ply support layer 82, a mid-plane impact layer 84, an upper skin layer 86 and a lower skin layer 88. The support layer 82 is a five-ply layer and includes, traversing radially outwards from the center of support layer 82 in direction of axis F, a 45 (forty-five) degree unidirectional fiberglass S-2 ply, a −45 (minus forty-five) degree unidirectional fiberglass S-2 ply, a −45 (minus forty-five) degree unidirectional graphite ply, a 45 (forty-five) degree unidirectional graphite ply, and a 90 (ninety) degree unidirectional graphite ply. The mid-plane impact layer 84 is a three-ply layer and includes, traversing radially outwards, a 0 (zero) degree unidirectional graphite ply, a 90 (ninety) degree unidirectional graphite ply, and a 0 (zero) degree unidirectional graphite ply. The upper skin layer 86 is a six-ply layer and includes, traversing radially outwards, a 0 (zero) degree unidirectional graphite ply, a 90 (ninety) degree unidirectional graphite ply, a 45 (forty-five) degree unidirectional graphite ply, a −45 (minus forty-five) degree unidirectional graphite ply, a −45 (minus forty-five) unidirectional fiberglass S-2 ply, and a 45 (forty-five) degree unidirectional fiberglass S-2 ply. The lower skin layer 88 is a five-ply layer and includes, traversing radially outwards, a 45 (forty-five) degree unidirectional graphite ply, a −45 (minus forty-five) degree unidirectional graphite ply, a −45 (minus forty-five) degree unidirectional graphite ply, a 45 (forty-five) degree unidirectional graphite ply, and a 90 (ninety) degree unidirectional graphite ply. FIG. 6B is a chart delineating each layer of the composite panel 80. It is to be appreciated that graphite ply constitutes about 80 percent while fiberglass constitutes about 20 percent of the total number of prepreg plies used in the composite panel 70, but other percentages may be utilized. It is also to be appreciated that the support layer 82, mid-plane impact layer 84, and upper skin layer 86 include prepreg plies that are arranged in a symmetrical order as we traverse radially outwards from the surface of the mandrel to the upper skin layer 86 in order to support thermal expansion of the plies and minimize or reduce warping of the plies during cure. For example, the inner most ply of support layer 82 that is immediately adjacent to the mandrel is the same as the outermost ply of the upper skin layer 86, which is a 45 (forty-five) degree unidirectional fiberglass S-2 ply. Similarly, there is a symmetrical arrangement of the other prepreg plies as we traverse radially outwards from the innermost ply of support layer 82.

Figure 7:
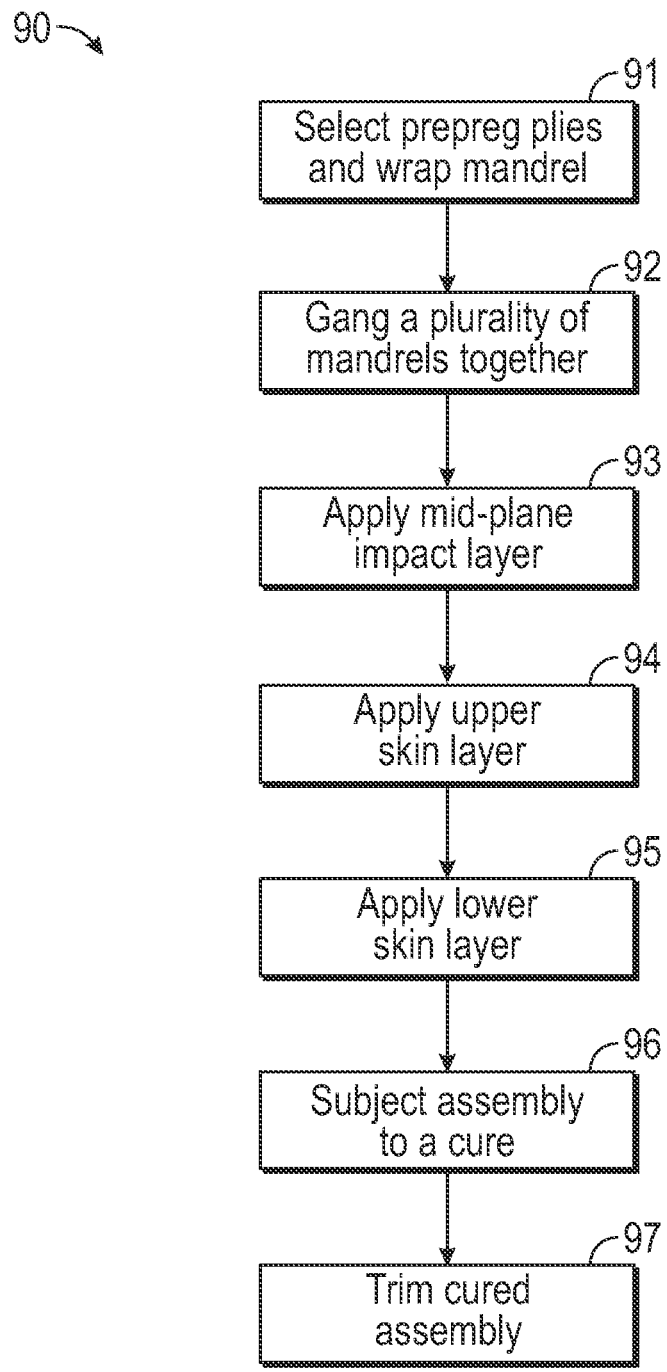
FIG. 7 illustrates a flowchart depicting a method of fabricating a composite panel according to an embodiment of the invention.

FIG. 7 illustrates a method 90 of fabricating a composite floor 30 (FIGS. 2A-2B) according to an embodiment of the invention. With continued reference to FIGS. 2A-6B, at 91, prepreg plies for support layer 52, 62, 72, 82 are compiled. In an embodiment, a plurality of rectangular shaped mandrels are selected as the core and a rectangular pattern for each prepreg ply comprising support layer 52, 62, 72, or 82 is cut to a predetermined length. One full wrap of each prepreg ply is wrapped around an external surface of a mandrel along its radial width. The wrapped prepreg ply is trimmed or cut to provide one full wrap of an external circumferential diameter of the mandrel. This wrapping process is repeated for the other prepreg plies that form the support layer 52, 62, 72 or 82. In 92, additional mandrels are wrapped according to the step depicted in 92. Further, the wrapped mandrels are ganged together along their longitudinal length according to, in one non-limiting example, the pattern depicted in FIG. 2B.

In 93, the mid-plane impact layer 54, 64, 74, 84 is applied onto the top surface of the support layer 52, 62, 72 or 82. Particularly, prepreg plies forming the mid-plane impact layer 54, 64, 74, 84 are selected and cut according to the shape and size of the composite panel 30 being fabricated. Each prepreg ply forming the mid-plane impact layer 54, 64, 74, 84 is applied to the top surface of the support layer 52, 62, 72 or 82. Similarly, in 94, prepreg plies forming the upper skin layer 56, 66, 76 or 86 are selected and cut according to the shape and size of the composite panel 30 being fabricated. Each prepreg ply is applied to the top surface of the mid-plane impact layer 54, 64, 74, 84. In 95, prepreg plies forming the lower skin layer 58, 68, 78 or 88 are selected and cut according to the shape and size of the composite panel 30 being fabricated. Next, the assembled group of uncured prepreg plies forming the support layer 52, 62, 72, 82, the mid-plane impact layer 54, 64, 74, 84, and the upper skin layer 56, 66, 76, or 86 is placed on each prepreg ply forming the lower skin layer 58, 68, 78, or 88 to form an uncured prepreg assembly. In an embodiment, the uncured prepreg assembly is laid onto a flat tooling surface and held together with caul plates on its edges for transmitting normal pressure to the finished layers during curing. At 96, the prepreg assembly is subjected to a co-curing process at an elevated temperature (e.g., in excess of about 250 degree Fahrenheit or 394 degree Kelvin) and at the same time, pressure may be applied (e.g., about 1 bar (about 100,000 Pa) to about 10 bar (about 1,000,000 Pa)) in order to activate the epoxy resin. In 97, the mandrels are removed from the cured laminate (i.e., cured prepreg assembly) and a trimming operation may be performed to the cured laminate in order to provide other features such as, for example, openings for tie-down pans or attachment of further components to complete the assembly of the composite panel 30. While a specific process 90 is described above, it is understood that other temperatures, pressures and environments may be used according to the specific application, and that process 90 need not be used in all aspects of the invention such as where openings or features are not needed.

The terminology used herein is for the purpose of describing particular embodiments only and is not intended to be limiting of the invention. While the description of the present invention has been presented for purposes of illustration and description, it is not intended to be exhaustive or limited to the invention in the form disclosed. Many modifications, variations, alterations, substitutions or equivalent arrangement not hereto described will be apparent to those of ordinary skill in the art without departing from the scope and spirit of the invention. Additionally, while the various embodiment of the invention have been described, it is to be understood that aspects of the invention may include only some of the described embodiments. Accordingly, the invention is not to be seen as limited by the foregoing description, but is only limited by the scope of the appended claims.

What is claimed is:

1. A composite panel, comprising:
   a support layer including a first plurality of prepreg plies wrapped around at least one mandrel;
   a mid-plane impact layer including a second plurality of prepreg plies, the mid-plane impact layer adjacent to the support layer;
   a upper skin layer including a third plurality of prepreg plies, the upper skin layer adjacent to the mid-place impact layer; and
   a lower skin layer including a fourth plurality of prepreg plies, the lower skin layer adjacent to the support layer;
   wherein each of the first, second, third, and fourth plurality of prepreg plies are co-cured to form the composite panel, and the first plurality, the second plurality, and the third plurality of prepreg plies are arranged symmetrically from a radially innermost prepreg ply of the support layer to a radially outermost prepreg ply of the upper skin layer.

2. The composite panel of claim 1, wherein the first plurality of prepreg plies includes at least 60 percent graphite prepreg plies.

3. The composite panel of claim 1, wherein a radially innermost prepreg ply of the support layer is the same as a radially outermost prepreg ply of the upper skin layer.

4. The composite panel of claim 1, wherein a radially innermost prepreg ply of the support layer is a fiberglass prepreg ply.

5. The composite panel of claim 4, wherein the radially innermost prepreg ply is one of a woven prepreg ply or a unidirectional prepreg ply.

6. The composite panel of claim 1, wherein the first plurality of prepreg plies includes at least two graphite prepreg plies.

7. The composite panel of claim 6, wherein the at least two graphite prepreg plies are either woven prepreg plies or unidirectional prepreg plies.

8. The composite panel of claim 1, wherein the fourth plurality of prepreg plies are graphite prepreg plies.

9. The composite panel of claim 1, wherein the upper skin layer includes at least 60 percent of graphite prepreg plies.

10. The composite panel of claim 1, where the composite panel is an aircraft composite panel.

* * * * *